United States Patent
Mani et al.

(10) Patent No.: US 12,026,286 B2
(45) Date of Patent: Jul. 2, 2024

(54) EXECUTING CONTAINERS DURING IDLE STATES

(71) Applicant: Hewlett-Packard Development Company, L.P., Spring, TX (US)

(72) Inventors: Srivatsan Mani, Spring, TX (US); Thomas Flynn, Spring, TX (US); Trey Elliott, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 381 days.

(21) Appl. No.: 17/419,067

(22) PCT Filed: Jul. 10, 2019

(86) PCT No.: PCT/US2019/041266
§ 371 (c)(1),
(2) Date: Jun. 28, 2021

(87) PCT Pub. No.: WO2021/006899
PCT Pub. Date: Jan. 14, 2021

(65) Prior Publication Data
US 2022/0129589 A1    Apr. 28, 2022

(51) Int. Cl.
*G06F 21/64* (2013.01)
*G06F 9/455* (2018.01)
*G06F 21/44* (2013.01)

(52) U.S. Cl.
CPC .......... *G06F 21/64* (2013.01); *G06F 9/45558* (2013.01); *G06F 21/44* (2013.01); *G06F 2009/45575* (2013.01); *G06F 2009/45579* (2013.01); *G06F 2009/45587* (2013.01); *G06F 2009/45595* (2013.01)

(58) Field of Classification Search
CPC ...... G06F 21/57; G06F 21/64; G06F 9/45558; G06F 21/44; G06F 2009/45575; G06F 2009/45579; G06F 2009/45587; G06F 2009/45595
See application file for complete search history.

(56) References Cited

U.S. PATENT DOCUMENTS

| | | | |
|---|---|---|---|
| 8,639,923 | B2 | 1/2014 | Lo et al. |
| 9,256,467 | B1 | 2/2016 | Singh et al. |
| 9,594,590 | B2 | 3/2017 | Hsu |
| 9,721,101 | B2 | 8/2017 | Jones et al. |
| 9,729,579 | B1 | 8/2017 | Marino et al. |
| 9,916,233 | B1 | 3/2018 | Qureshi et al. |
| 10,061,610 | B2 | 8/2018 | Zheng et al. |

(Continued)

FOREIGN PATENT DOCUMENTS

| | | |
|---|---|---|
| WO | 2016/077367 A1 | 5/2016 |
| WO | 2017/111843 A1 | 6/2017 |

*Primary Examiner* — Paul E Callahan
(74) *Attorney, Agent, or Firm* — Quarles & Brady LLP

(57) ABSTRACT

In some examples, non-transitory computer-readable storage stores machine-readable instructions that, when executed by a processor, cause the processor to identify an idle state of a computing device; evaluate a root of trust between a security chip and a container system to verify that the container system is a trusted container system; enable the trusted container system; receive a container during the idle state; and execute the container during the idle state using the trusted container system.

15 Claims, 5 Drawing Sheets

(56) References Cited

U.S. PATENT DOCUMENTS

| | | |
|---|---|---|
| 2012/0060171 A1 | 3/2012 | Bobroff et al. |
| 2014/0137104 A1 | 5/2014 | Nelson et al. |
| 2015/0378782 A1 | 12/2015 | Hks et al. |
| 2018/0309747 A1 | 10/2018 | Sweet et al. |
| 2018/0349610 A1 | 12/2018 | Gupta et al. |
| 2019/0042759 A1 | 2/2019 | Smith et al. |
| 2020/0004451 A1* | 1/2020 | Prohofsky .............. G06F 3/0604 |

* cited by examiner

EXECUTING CONTAINERS DURING IDLE STATES

BACKGROUND

Distributed computing increases computational efficiency by distributing tasks across multiple computing devices. For example, distributed computing may allow a central server to assemble computing tasks into containers for execution by computing devices in communication with a distributed system.

BRIEF DESCRIPTION OF THE DRAWINGS

Various examples will be described below referring to the following figures.

DETAILED DESCRIPTION

As explained above, a distributed system distributes workloads across multiple computing devices to realize increased computational efficiency. A distributed system may need additional resources to satisfy the computational needs placed on the distributed system. Increasing the number of computing devices available to the distributed system for the execution of tasks is an expensive and tedious endeavor.

This disclosure describes various examples of a distributed system in which workloads are distributed to computing devices that are in an idle state. For instance, within an organization, a central server may identify computing devices already belonging to the organization that are in an idle state, and the central server may use those idle computing devices to perform various tasks. This use of existing resources during idle states mitigates the need to locate or purchase additional, expensive computing devices. Tasks may be distributed to idle computing devices in the form of containers, which are received and executed by container systems on the idle computing devices.

In addition, to mitigate security risks (e.g., exposure to malicious code) associated with the distribution and execution of such containers, an idle computing device may authorize a distributed system to assign containers a certificate of authority specific to the idle computing device. The certificate of authority may be related to a cryptographic key specific to the idle computing device. A security chip on the idle computing device may verify the certificate of authority of a container to ensure the container was provided by an authorized source. In this way, the idle computing device is protected from malicious containers. Similarly, to mitigate the risk that a container is being sent to a malicious idle computing device, the idle computing device may include a container system with an associated cryptographic key specific to the idle computing device. The security chip may evaluate the cryptographic key to verify the container system has not been modified from a trusted state.

Figure 1:
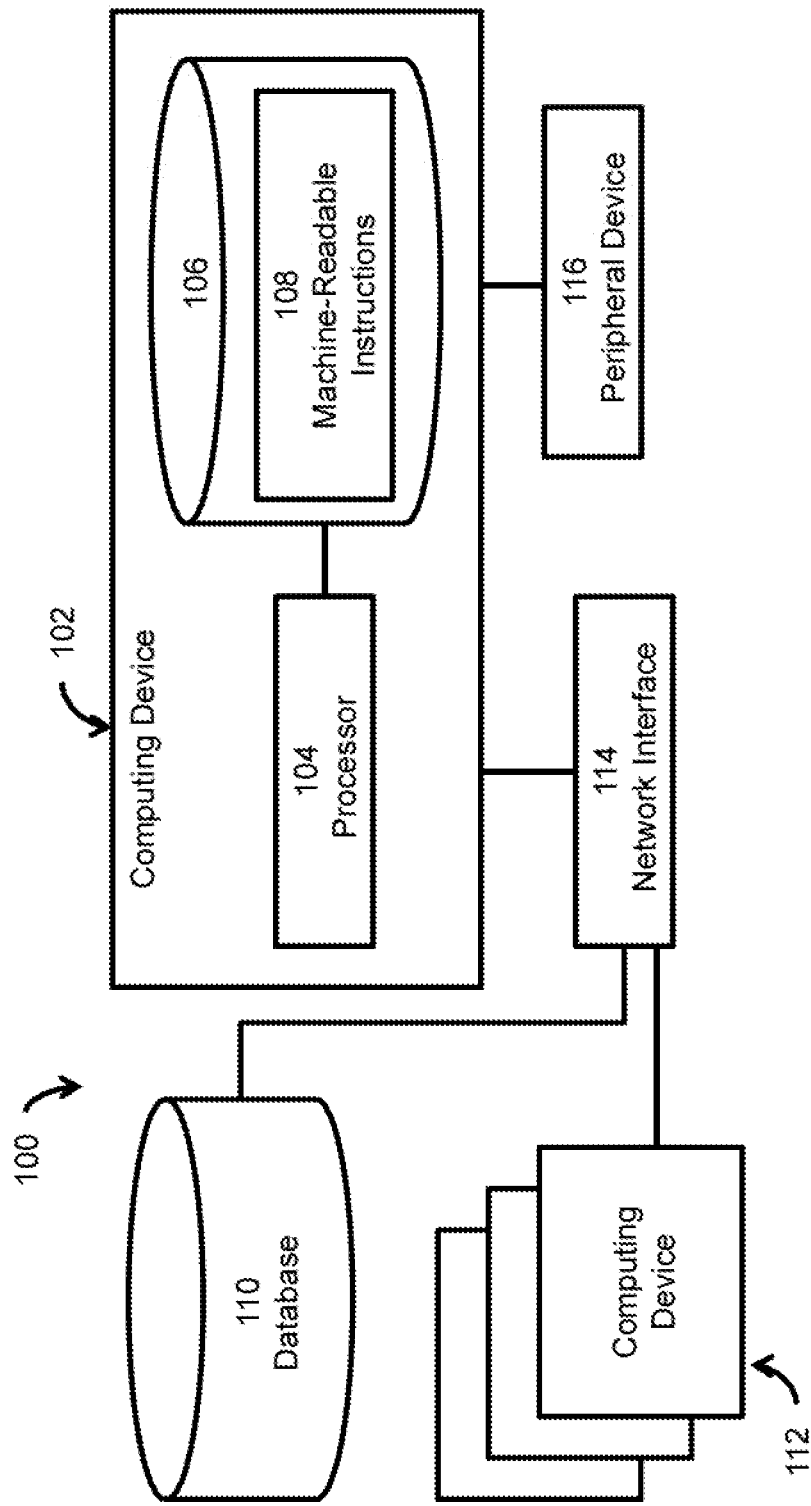
FIG. 1 is a schematic diagram of an illustrative distributed system, in accordance with various examples.

FIG. 1 is a schematic diagram of an illustrative distributed system 100, in accordance with various examples. The distributed system 100 comprises a computing device 102, multiple computing devices 112, and a network interface 114 coupled to the computing devices 102, 112. The computing device 102 may include a processor 104 coupled to a computer-readable storage 106 storing machine-readable instructions 108. The computing device 102 may be a laptop computer, desktop computer, or server. The processor 104 may comprise a microprocessor, a microcomputer, or a microcontroller. The computer-readable storage 106 may include a hard drive, solid state drive (SSD), flash memory, electrically erasable programmable read-only memory (EEPROM), or random access memory (RAM).

A peripheral device 116 may be coupled to the computing device 102. The peripheral device 116 may include an input device, such as a keyboard, mouse, external drive, or USB memory stick, to provide a task for execution on the distributed system 100. The peripheral device 116 may also include an output device, such as a display, to indicate how workloads are being shared across the distributed system 100. The multiple computing devices 112 may be laptop computers, desktop computers, servers, tablets, or mobile phones. The network interface 114 and computing devices 102, 112 may be communicatively coupled together, such as via a bus. The network interface 114 may enable communication over a network. The network interface 114 may include a wired connection, such as Ethernet or universal serial bus (USB), or a wireless connection, such as Wi-Fi or Bluetooth. The network interface 114 may receive tasks for execution from a database 110 or multiple computing devices 112 or transmit containers for execution by multiple computing devices 112. Execution of the machine-readable instructions 108 by the processor 104 causes the processor 104 to perform some or all of the actions attributed herein to the computing device 102 and/or the processor 104.

In operation, a computing device 112 may provide a task to be assembled into a container by the computing device 102 for execution by another computing device 112 or group of computing devices 112. The processor 104 of computing device 102 may receive the task and determine how to distribute the task. For example, the task may require breaking down into multiple subtasks or the owner of the task may request the task be performed multiple times. The processor 104 may compartmentalize the task into multiple subtasks or duplicate the task. The processor 104 may assign a container, which may include a task, a subtask, or a duplicated task, a certificate of authority. The processor 104 may send the container to a computing device 112 or group of computing devices 112. The computing device 112 may verify the certificate of authority associated with the container and execute the container, as explained in greater detail below with regard to FIG. 2. In some examples, the computing device 112 may send a message to the computing device 102 indicating whether the container was successfully executed. The message may also include an indication of the reason for any unsuccessful executions, such as failure to verify the certificate of authority, insufficient resources, or withdrawal of the certificate of authority.

In various examples, when communicating with multiple computing devices 112, a computing device 102 may assign each computing device 112 a different certificate of authority. When subsequently distributing a container to a particular computing device 112, the computing device 102 may assign the container a certificate of authority corresponding to that particular computing device 112. For example, the computing device 102 may receive a task from database 110. The computing device 102 may determine that the task should be broken into a series of subtasks. The computing device 102 may create multiple containers, each including a subtask. The computing device 102 may determine that each container will be executed on a separate computing device 112. The computing device 102 may subsequently assign each container a certificate of authority corresponding to the particular computing device 112 the container will be sent to.

In various examples, when assigning a container a certificate of authority corresponding to a computing device 112, the computing device 102 may assign the certificate of authority to the container during an idle state of the computing device 112. The computing device 102 may cease assigning that certificate of authority to containers when the computing device 112 corresponding to that certificate of authority is no longer in an idle state.

In some examples, the computing device 102 may receive a message from the computing device 112 indicating the computing device 112 is in an idle state or is not in an idle state. The computing device 102 may maintain records regarding idle states for various computing devices 112 in the computer-readable storage 106, for example, in a data structure. In other examples, the computing device 102 may use timing and/or duration information of a previous idle state of the computing device 112 as the basis for predicting the timing and/or duration of a future idle state. Such information may be stored in computer-readable storage 106. In some examples, the computing device 102 may implement machine-readable instructions that are trained with idle state data for computing device 112 so that the computing device 102 may predict the existence of idle states for the computing device 112. In some examples, the machine-readable instructions may be trained with idle state data for multiple computing devices 112 so that the computing device 102 may predict the existence of the idle states for the multiple computing devices 112.

In various examples, a certificate of authority may correspond to multiple computing devices 112. In some examples, the size and grouping of these computing devices may be arbitrary. In other examples, the size and grouping of these computing devices may be non-arbitrary, such as when there are multiple computing devices associated with a particular enterprise. An enterprise may be any organization, such as a company, business unit, or group of individuals with a common purpose. A distribution system 100 may service multiple enterprises. A set of computing devices owned by one enterprise may use the same certificate of authority. Any container sent to a computing device of a particular enterprise may be assigned the certificate of authority for that enterprise.

Figure 2:
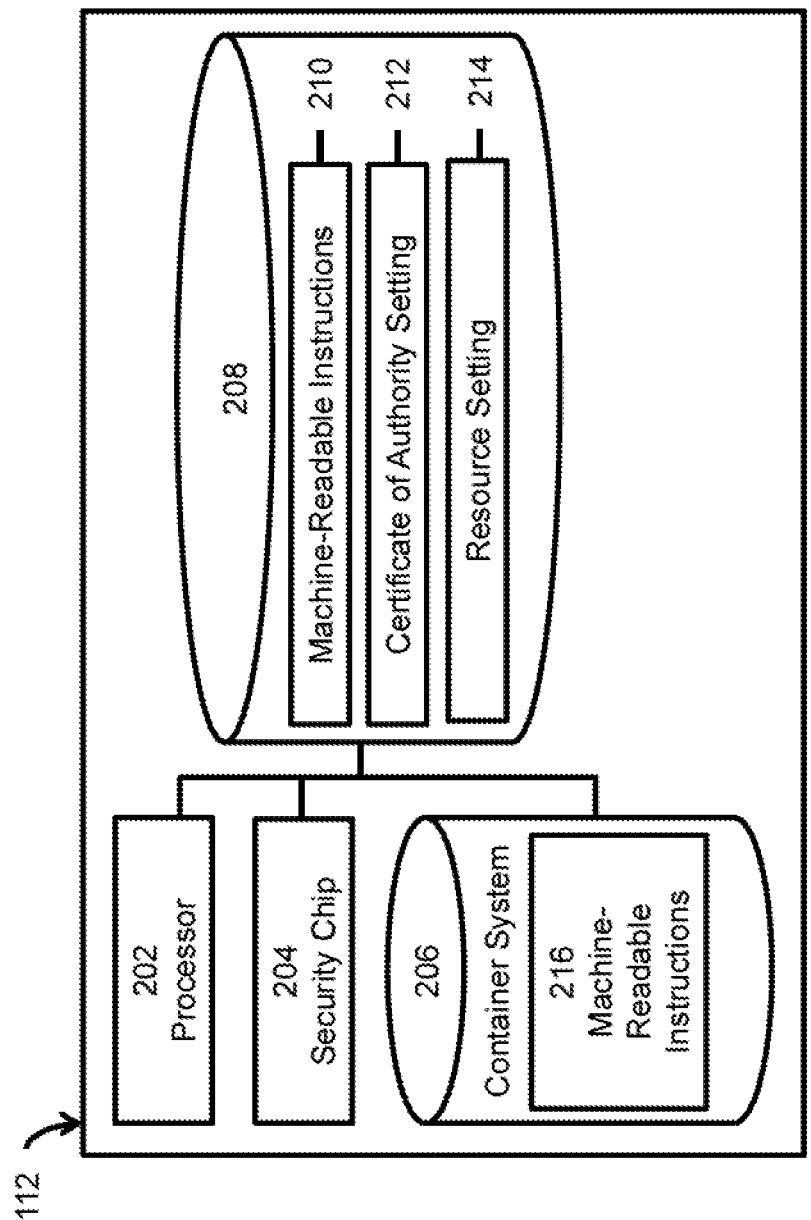
FIG. 2 is a schematic diagram of a computing device within a distributed system, in accordance with various examples.

FIG. 2 is a schematic diagram of a computing device 112 within a distributed system 100, in accordance with various examples. The computing device 112 comprises a processor 202, a security chip 204, a container system 206, and computer-readable storage 208. The processor 202 may comprise a microprocessor, a microcomputer, a microcontroller, a field programmable gate array (FPGA), or discrete logic. The security chip 204 may be an integrated circuit or collection of discrete logic. The security chip 204 may include computer-readable storage to store cryptographic keys. The container system 206 may include machine-readable instructions 216, which are described below. The computer-readable storage 208 may include machine-readable instructions 210, a certificate of authority setting 212, and a resource setting 214. The processor 202 may execute machine-readable instructions 210 to implement some or all of the actions attributed herein to the computing device 112 and/or the processor 202 (e.g., the method in connection with FIG. 4 or FIG. 5).

In various examples, during manufacture, a cryptographic key may be prepared for the computing device 112 and associated with the security chip 204 of that computing device 112. The cryptographic key may be stored in memory that is part of the security chip 204 or main memory or long-term memory of the computing device 112, such as SSD or RAM. A certificate of authority associated with the computing device 112 may be related to the cryptographic key, for example using a data structure that cross-references the certificate of authority with the cryptographic key.

In various examples, during manufacture, a cryptographic key may be prepared for the computing device 112 and associated with the container system 206 of that computing device 112. The cryptographic key may be stored in memory that is part of a security chip 204 or main memory or long-term memory of the computing device 112, such as SSD or RAM.

In various examples, the container system 206 may comprise machine-readable instructions 216 that operate in parallel with an operating system of the computing device 112 (e.g., an operating system that forms part of the machine-readable instructions 210). The machine-readable instructions 216 may be stored in memory that is part of main memory or long-term memory of the computing device 112, such as SSD, RAM, flash memory, or EEPROM. The machine-readable instructions 216 may comprise instructions which, when executed, cause the processor 202 to execute or process a container. The container system 206 may isolate the contents of the container from the remainder of the computing device 112, such that the operating system and user cannot view the contents of the container. Once the container is executed or processed, the container system 206 (e.g., in tandem with the processor 202) may send a message to the computing device 102 indicating execution of the container was successful. The message may include an indication of resources used during the execution.

In various examples, the container system 206 may comprise machine-readable instructions 216 that operate in parallel with the operating system of the computing device 112. The machine-readable instructions 216 may comprise instructions which, when executed, cause the processor 202 to handle the scheduling of execution of containers from multiple distributed systems. For example, the scheduling may be on a first-in-first-out basis, such that each container is processed in the order it is received, or the scheduling may be prioritized based on resources used by each container.

In various examples, the container system 206 may comprise machine-readable instructions 216 associated with hardware components of the computing device 112, such as network cards, video adapters, sound cards, local buses, input/output devices, and computer storage devices. The machine-readable instructions 216 may be stored in memory that is part of main memory or long-term memory of a computing device 112, such as SSD or RAM, or that is flash memory or EEPROM. To prevent corrupting the hardware components or computing device 112, an update to the machine-readable instructions may need to be protected by extra security measures. Verifying a cryptographic key associated with the container system 206 prior to authorizing an update may prevent unauthorized manipulation of the machine-readable instructions.

In some examples, the computer-readable storage 208 may be memory that is part of the security chip 204. In some examples, the computer-readable storage 208 may be memory that is part of main memory or long-term memory of the computing device 112, such as SSD or RAM. In some examples, the computer-readable storage 208 may be memory that is part of the security chip 204 and part of main memory or long-term memory of the computing device 112, such as SSD or RAM.

In various examples, the certificate of authority setting 212 may be stored in memory that is part of the security chip 204, in a registry of the computing device 112, or in main memory or long-term memory of the computing device 112, such as SSD or RAM. The certificate of authority setting 212 may be adjustable by a user of the computing device 112. The user may supply a password when modifying the certificate of authority setting 212. Modification of the certificate of authority setting 212 may be limited to certain users or certain groups of users, such as an administrator. The certificate of authority setting 212 may specify that containers are authorized from certain distributed systems but not from others. This may further increase the security of the computing device 112 by allowing the computing device 112 to withdraw authority from a distributed system that has been compromised by malicious code or is no longer a trusted source of containers.

In various examples, when the certificate of authority setting 212 specifies the computing device 112 is no longer accepting containers from the distributed system 100, the computing device 112 may delete a container received from the distributed system 100 without executing, processing, or otherwise handling the container. The computing device 112 may send a message to the computing device 102 indicating the container was rejected. The message may include an indication of the reason for the rejection.

In various examples, when the certificate of authority setting 212 specifies a computing device 112 is no longer accepting containers from the distributed system 100, the computing device 112 may send a message to the computing device 102 withdrawing the certificate of authority. To prevent communication of containers over the network interface 114 when containers are not being accepted, the computing device 112 may send such a message to the computing device 102 when the certificate of authority setting 212 is modified.

In various examples, the resource setting 214 may be stored in memory that is part of the security chip 204, in a registry of the computing device 112, or in main memory or long-term memory of the computing device 112, such as SSD or RAM. The resource setting 214 may restrict the handling of containers to containers that use or do not use certain resources of a computing device 112. For example, the computing device 112 may limit access to long-term memory, short-term memory, or processing power to a certain percentage and adjust the resource setting to indicate such restrictions.

In various examples, the resource setting 214 may specify a duration of availability of the computer device 112 for executing containers. The resource setting 214 may include a timer, where the authorization to handle containers begins or ends after the timer expires. The timer may be adjustable by a user of the computing device 112. The timer may be based upon known durations of idle time of the computing device 112, such as after normal enterprise hours, during the middle of the night, or on weekends. The timer may be based upon a previous duration of authorization. The timer may be based upon a duration derived from a series of previous durations of authorization.

Figure 3:
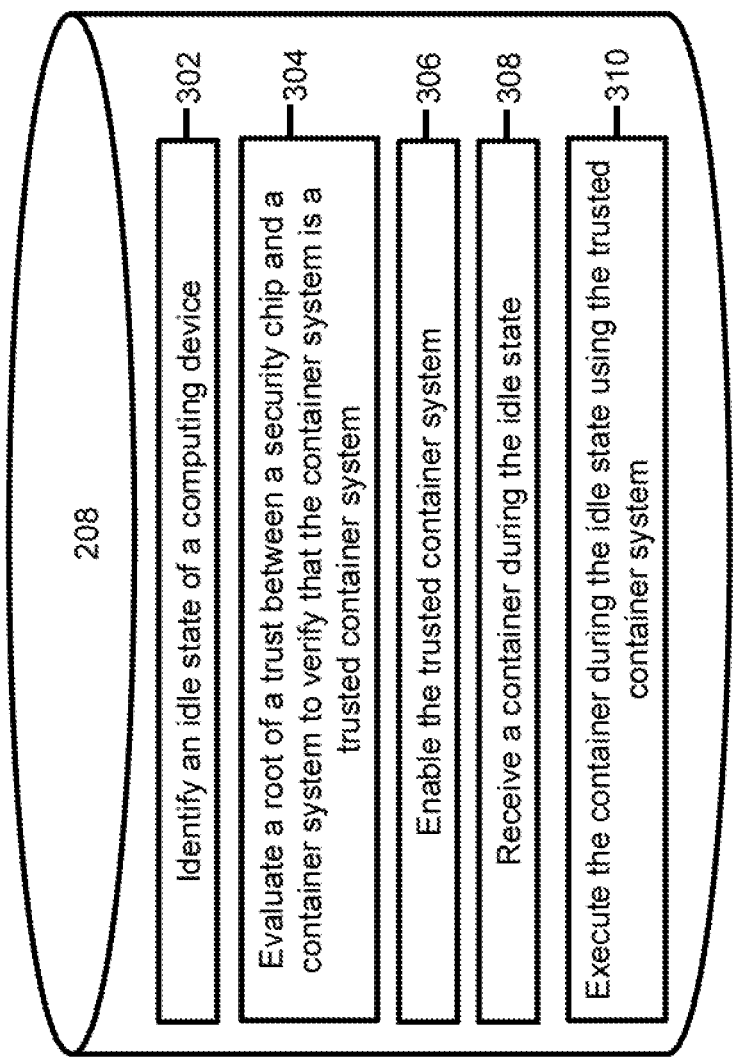
FIG. 3 is a schematic diagram of a computer-readable storage with machine-readable instructions in a computing device of a distributed system, in accordance with various examples.

FIG. 3 is a schematic diagram of a computer-readable storage 208 with machine-readable instructions 302, 304, 306, 308, 310 for a computing device 112 in a distributed system 100 to execute a container, in accordance with various examples. The instructions 302, 304, 306, 308, 310 may be machine-readable instructions for execution by a processor 202 and are illustrative examples of the machine-readable instructions 210. Execution of instruction 302 may cause the processor 202 to indicate to the distributed system 100 via a network interface 114 that computing device 112 is in an idle state. Execution of instruction 304 may cause the processor to evaluate a cryptographic key corresponding to the computing device 112 and associated with the container system 206 to verify the container system 206 has not been corrupted by malicious code. If the container system 206 is trusted, execution of instruction 306 may cause the processor 202 to enable the container system 206. Execution of instruction 308 may cause the processor 202 to receive a container via the network interface 114 during the idle state. Execution of instruction 310 may cause the processor 202 to execute or process the container using the trusted container system. Execution of the container may include executing machine-readable instructions in the container or processing data included in the container.

In various examples, execution of instruction 304 may cause the processor 202 to evaluate the cryptographic key associated with a security chip 204 against the cryptographic key associated with the container system 206 to verify the container system 206 has not been modified in an unauthorized way. If the container system 206 has not been modified in an unauthorized way, a root of trust may exist between the security chip 204 and the container system 206, and the container system may be a trusted container system. Modification of the container system 206 may indicate the presence of a disruptive application, such as malicious code. In some instances, the computing device 112 may send a message to the computing device 102 indicating the computing device 112 is unavailable to handle containers.

In various examples, execution of instruction 310 may cause the processor 202 to evaluate the cryptographic key associated with the security chip 204 against the certificate of authority associated with the container to verify that the container comes from an authorized distributed system and is meant for execution by the computing device 112. In response to verification of the container, the processor 202 may execute or process the container using the trusted container system. If the security chip 204 cannot verify the certificate of authority associated with the container, the container may not be executed or processed. The certificate of authority could indicate the container came from an unauthorized source or that the container may be intended for another computing device in the authorized distributed system. The computing device 112 may send a message to the computing device 102 rejecting the container. The message may include an indication of the reason for the rejection.

Figure 4:
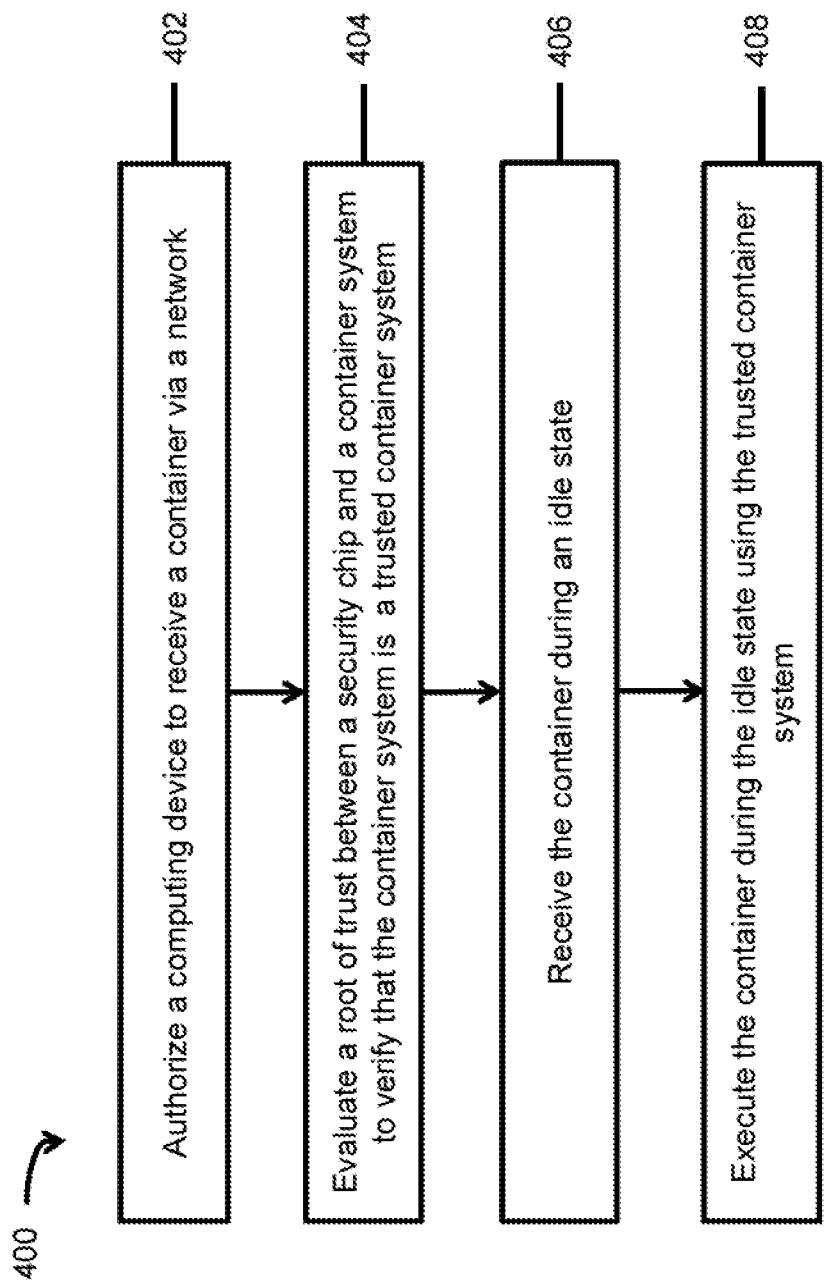
FIG. 4 is a flow diagram of an illustrative method to execute a container using a computing device in a distributed system, in accordance with various examples.

FIG. 4 is a flow diagram of an illustrative method 400 to execute a container using a computing device of a distributed system, in accordance with various examples. The method 400 may be performed, for instance, by a computing device 112. The method 400 includes authorizing the computing device to receive a container via a network interface (402). In addition, the method 400 includes evaluating a root of trust between a security chip and a container system to verify that the container system is a trusted container system (404). The method 400 also includes receiving the container during an idle state of the computing device (406). The method 400 further includes executing the container during the idle state using the trusted container system (408).

In various examples, the method 400 to authorize a computing device includes registering the computing device with a distributed system. The registration may include providing information about resources of the computing device. The resources may include processing ability, available short-term and long-term memory, and duration available for use. The distributed system may use the information in determining whether to assign a specific container to the computing device.

In various examples, the method 400 to authorize a computing device includes registering the computing device with multiple distributed systems. Each distributed system may use a same certificate of authority associated with the computing device or each distributed system may be assigned a different certificate of authority associated with the computing device.

In various examples, the computing device may add or remove its registration with a distributed system by updating a certificate of authority setting. The update may remove the computing device from one, multiple, or all distributed systems previously granted authority. The update may occur when the computing device is removed permanently from a distributed system, such as when the computing device is retired from an enterprise or when the enterprise changes providers of distributed computing services. The update may allow the computing device to be removed temporarily from a distributed system, such as when the computing device is taken offline for upgrades or repairs or when the distributed system is taken offline for upgrades or repairs.

In various examples, the method 400 authorizing the computing device includes registering the computing device with another computing device to create a distributed system. The registration may include providing a certificate of authority associated with each computing device. Either of the computing devices may provide a container for executing or processing by the other computing device or either of the computing devices may receive a container for executing or processing from the other computing device.

Figure 5:
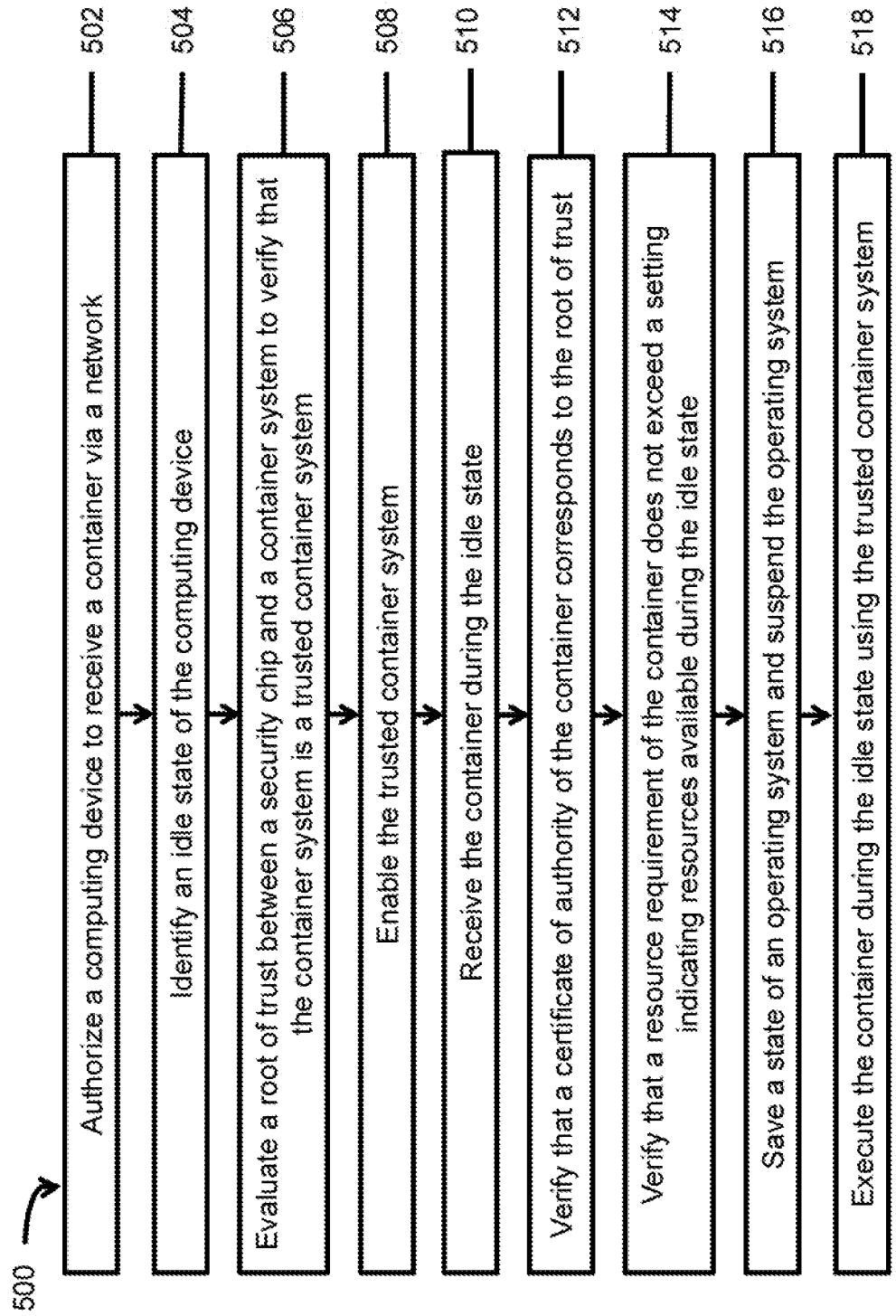
FIG. 5 is a flow diagram of an illustrative method to execute a container using a computing device in a distributed system, in accordance with various examples.

FIG. 5 is a flow diagram of an illustrative method 500 to execute a container using a computing device (e.g., a computing device 112) in a distributed system, in accordance with various examples. The method 500 includes authorizing the computing device to receive a container via a network interface (502). The method 500 also includes identifying an idle state of the computing device (504). The method 500 further includes evaluating a root of trust between a security chip and a container system to verify that the container system is a trusted container system (506). The method 500 still further includes enabling the trusted container system (508). The method 500 additionally includes receiving the container during an idle state of the computing device (510). The method 500 also includes verifying that a certificate of authority of the container corresponds to the root of trust (512). Furthermore, the method 500 includes verifying that a resource usage of the container does not exceed a setting indicating resources of the computing device available during the idle state (514). In addition, the method 500 includes saving a state of an operating system and suspending the operating system (516). The method 500 further includes executing the container during the idle state using the trusted container system (518).

In various examples, the method 500 may save the state of an operating system of the computing device as an added security layer to protect the operating system from possible malicious code that may be within the container received from the distributed system. If the method 500 is unable to save the state of the operating system, the computing device may send a message to a central server of the distributed system indicating the container cannot be executed or processed. The message may include an indication of the reason for the failure.

In various examples, the method 500 may suspend the operating system as an added security layer to protect the operating system from possible malicious code that may be within the container received from the distributed system. After containers are executed or processed and the results returned to the distributed system, the computing device may determine that an idle state no longer exists or that no more containers are to be received from the distributed system. The operating system may then be restored. The computing device may verify the operating system has not been modified from the saved state. Modification from the saved state may indicate the presence of a disruptive application, such as malicious code. In some instances, if the suspension of the operating system fails, the computing device 112 may send a message to the computing device 102 indicating the computing device 112 is unavailable to handle containers.

In various examples, the method 500 may fail to verify that the resource usage of the container does not exceed the setting indicating resources of the computing device available during the idle state. If verification fails, the computing device may send a message to a central server of the distributed system indicating the container was rejected. The message may include an indication of the reason for the rejection.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. Non-transitory computer-readable storage to store machine-readable instructions that, when executed by a processor of a computing device, cause the processor to:
   identify an idle state of the computing device;
   evaluate a root of trust between a security chip and a container system to verify that the container system is a trusted container system;
   enable the trusted container system;
   receive a container during the idle state; and
   execute the container during the idle state using the trusted container system.

2. The computer-readable storage of claim 1, wherein the machine-readable instructions instruct the processor to verify the container with a certificate of authority prior to executing the container, the certificate of authority corresponding to the root of trust.

3. The computer-readable storage of claim 1, wherein the machine-readable instructions instruct the processor to:
   check a resource usage of the container, the resource usage indicating resources used for the container to execute;
   check a setting indicating resources available during the idle state; and
   prior to executing the container, verify that the resource usage does not exceed the setting.

4. The computer-readable storage of claim 3, wherein the setting is changeable to indicate that resources are no longer available.

5. The computer-readable storage of claim 1, wherein the machine-readable instructions instruct the processor to:
save a state of an operating system; and
suspend the operating system prior to executing the container.

6. A system comprising:
a network interface;
a first computing device communicatively coupled to the network interface, the first computing device to:
receive a task via the network interface;
produce a container including the task; and
assign a certificate of authority to the container; and
a second computing device communicatively coupled to the network interface, the second computing device to:
receive the container via the network interface;
verify the container using the certificate of authority; and
execute the verified container during an idle time of the second computing device.

7. The system of claim 6 further comprising a third computing device communicatively coupled to the network interface, the third computing device to:
receive a second container via the network interface, the second container containing a second task and having been assigned a second certificate of authority;
verify the second container using the second certificate of authority; and
execute the verified second container during an idle time of the third computing device.

8. The system of claim 7, wherein the task and the second task are part of a third task.

9. The system of claim 6, wherein the second computing device comprises:
a processor; and
storage comprising machine-readable instructions that cause the processor to:
evaluate a root of trust between a security chip of the second computing device and a container system of the second computing device to verify that the container system is a trusted container system;
verify that the certificate of authority assigned to the container corresponds to the root of trust; and
execute the container using the trusted container system in response to the verification of the certificate of authority.

10. The system of claim 9, wherein execution of the machine-readable instructions causes the processor to identify an idle state of the second computing device and request a container from the system.

11. A method comprising:
authorizing a computing device to receive a container via a network;
evaluating a root of trust between a security chip and a container system to verify that the container system is a trusted container system;
receiving the container during an idle state; and
executing the container during the idle state using the trusted container system.

12. The method of claim 11 comprising:
verifying a certificate of authority of the container against the root of trust;
verifying that resources are available to execute the container; and
suspending an operating system.

13. The method of claim 11, wherein the idle state has a fixed duration.

14. The method of claim 11, wherein the idle state has a duration determined by a duration of a previous authorization.

15. The method of claim 11, wherein the idle state has a duration determined by a changeable setting of the computing device.

* * * * *